3,376,198
METHOD OF PRODUCING ANTIBODIES IN MILK
William E. Petersen, St. Paul, Minn., and Berry Campbell, Monrovia, Calif., assignors to Collins Products, Inc., Waukon, Iowa, a corporation of Iowa
No Drawing. Continuation-in-part of application Ser. No. 789,502, Jan. 28, 1959, which is a continuation-in-part of application Ser. No. 500,038, Apr. 7, 1955. This application July 21, 1965, Ser. No. 473,833
14 Claims. (Cl. 167—78)

This invention relates to the production in the mammary glands of ungulates, of high specific antibody or protective principle effective against a wide range of antigens and useful for the precipitation of antigens in purification or analysis of protein compositions in the manner of an antiserum. More particularly, the invention concerns the production of milk in its natural state fortified with naturally occurring antibodies to preselected antigens. This application is a continuation-in-part of the application Ser. No. 789,502, filed Jan. 28, 1959, as a continuation-in-part of an earlier application Ser. No. 500,038, filed April 7, 1955, both now abandoned.

The term "milk in its natural state," as used herein, means milk or colostrum in the form in which it comes from the udder of a cow or other ungulate and prior to processing of any kind.

Naturally occurring antibodies refers to antibodies occurring in the milk as a result of the natural metabolic processes of the cow, even though subject to external influences. It does not refer to antibodies added to milk subsequent to milking. The term "antigen" refers to a material antigenic to the treated ungulate.

In an abandoned patent application, Ser. No. 628,987, filed Nov. 15, 1945, an abstract of which was published in the U.S. Patent Office Gazette on Dec. 5, 1950, the applicant, Holm, suggests the possibility of treating disease by the ingestion of milk fortified with naturally occurring antibodies where said antibodies have been induced by actively immunizing a cow with a preselected antigen. However, Holm failed to secure a significant number of antibodies because he followed the usual immunization procedure of intramuscular and intravenous injections of antigen, hoping that the milk would absorb a significant proportion of these antibodies from the blood of the animal. This type of injection does not yield a therapeutically significant concentration of antibodies in milk in its natural state.

In August 1951, Porter, working under our direction, published his doctoral thesis at the University of Minnesota (Biological Abstracts 1953, p. 951, par. 10, 185), in which he suggested the possibility of manufacturing antibodies in the cow's udder by infusion of antigen into the udder of a lactating cow. This was a revolutionary departure from prior thinking, for although it was known that relatively minor quantities of antibodies could enter the milk from the blood stream and that antigens could exercise their effects via the udder, it was not thought that the udder itself could play a significant manufacturing role in the immunity scheme.

Porter therefore suggested the infusion of selected antigens into the cow's udder during the lactation period with the hope of increasing the effective concentration of antibody in milk in its natural state to effective economic levels; but Porter's proposal, like Holm's procedure, was incapable of accomplishing the desired results.

In addition to the problem of securing an increase in numbers of antibodies in milk in its natural state, there is also the extremely important matter of economic feasibility in relation to procedural requirements. Although it is possible with the methods of Holm and Porter to produce antibody-containing milk, and also possible to employ well known concentration procedures to reach some effective level of therapeutic concentration, this would be economically unfeasible for the reason that the high cost of producing such antibodies precludes any widespread use.

The ultimate problem which faced us was to discover and provide a method of antibody production in the cow's udder which will yield milk in its natural state with the required concentration of antibodies, without requiring further concentrating or processing of the milk. By this invention we have solved that problem.

A principal object of this invention thus is to provide a method of producing milk in its natural state fortified with a concentration of naturally occurring antibodies not attained heretofore.

It is also an object of this invention to provide a composition comprising milk in its natural state fortified with naturally occurring antibodies in therapeutically significant concentrations.

Another major object of this invention is to provide a high concentration of antibodies on an economically feasible basis for use in precipitating proteins from protein compositions for purposes of purification, analysis and the like.

With the above and other objects in view which will appear as the description proceeds, this invention resides in the novel procedures and methods substantially as hereinafter described and more particularly defined by the appended claims, it being understood that such changes in the precise embodiment of the hereindisclosed invention may be made as come within the scope of the claims.

In accordance with the present invention, high concentrations of specific antibody in the milk of ungulates (particularly cows, goats, sheep, etc.) are produced against any antigen by introducing such antigen into the udder of the animal during the pre-parturition period that is, during pregnancy. This may be done through the teat canals, in which event the introduction is ordinarily referred to as infusion, or the antigen may be injected hypodermically through the wall of the udder close to the base of each teat, or wherever the injected antigen is sure to reach the cistern of the udder. To product the maximum concentration of antibodies, the antigen may be introduced into the udder at about weekly intervals prior to parturition. Subsequent to parturition, declining antibody concentrations can be increased by periodically introducing booster shots of the selected antigen into the udder during the lactating period.

Although the amounts of antigen introduced, the frequency (time interval), and the number of booster doses may vary widely, the highest antibody response in the milk results from the introduction of a plurality of doses of increasing amounts into the udder of an animal in its pre-parturition period over a period of several weeks. For example, the initial injections can be initiated from about two to eight weeks before parturition.

The size and concentration of the antigen doses are not critical but are selected for convenience. It has been found that increasing or decreasing the size of the antigen injection does not produce a corresponding increase or decrease in the protective principle titer of the resulting milk.

Booster shots, when given to the lactating cow, may likewise be spaced to suit the convenience of the operator, except that they should be administered frequently enough that an antiphylactic reaction does not occur. For most species that time is less than about ten to fourteen days. To avoid local irritation and congestion, it is usually preferred that booster shots not be given more frequently than every other day.

The antigenic substances are suspended in liquid medium for infusion or injection, such as, for example, a sterile physiological saline solution. The booster shots which are administered to the lactating cow may be given intravenously, intramuscularly, subcutaneously, or may be made into the duct system of the udder through the teat meatus and into the gland cistern. The udder may, if desired, be massaged for better penetration of the antigen into the duct system of the udder.

The antigenic substances which are employed in the practice of this invention for the production of protective principles include bacteria, viruses, proteins, animal tissue, plant tissue, spermatosoa, rickettsia, metazoan parasites, mycotic molds, fungi, pollens, dust and similar substances which are antigenic to the treated ungulate. Exemplary antigens include: bacterial—*Salmonella pullorum, Salmonella typhi, Salmonella paratyphi, Staphylococcus aureus, Staphylococcus albus, Staphylococcus pyogenes*, pneumococci, streptococci, and the like; viral—Influenza Type A, fowl pox, turkey pox, herpes simplex and the like; protein—egg albumin and the like; tissue—blood and sperm. It is to be understood that these materials are merely representative of the almost infinite number and variety of antigenic substances against which specific antibodies or protective principle can be produced in the ungulate udder. The expressions "antigenic substance" and "antigenic material" means anything which stimulates antibody production and include materials which are antigenic in and of themselves to the ungulate and also non-antigenic materials which act as antigens in the presence of adjuvants. Antigenic disease organisms are specifically included within these expressions.

EXAMPLE 1

The experimental subject was a Jersey cow, five weeks before parturition. The antigen was dead *Salmonella pullorum*. The initial dose of antigen was introduced into the udder through the teat canals, 1 ml. of antigen per quarter, and each containing approximately 5 billion organisms. One week later, a repeat does of 1 ml. antigen per quarter but containing about 10 billion organisms was introduced into the udder. Subsequent doses of 1 ml. per quarter containing increasingly larger concentrations of the antigenic material, about 20, 30 and 40 billion dead organisms, respectively, were injected at one week intervals. Milk following parturition agglutinated the antigen at more than 100,000 dilutions, a dilution greatly in excess of that produced by the methods of Porter or Holm.

The antibody or protective principle in the milk decreased rapidly following parturition, from agglutination at more than 100,000 dilutions immediately following parturition to agglutination at only 1000 dilutions in four weeks. The level of the protective principle was then brought up and maintained by the systemic administration of antigen.

EXAMPLE 2

The procedure of Example 1 was repeated on a different cow, the only difference being that the doses of antigen both for the initial introduction and the repeat doses were only one-tenth as concentrated as those used in Example 1. The resulting milk was high in protective principle, there being no apparent difference from the milk of the first example.

EXAMPLE 3

To show the production of protective principle against a specific combination of antigenic substances, a mixture of approximately equal numbers of Pneumococcus, type 1, Pneumococcus, type 2; *Salmonella typhi, Salmonella parathyphi and Staphylococcus albus*, was introduced into the udder of a cow two weeks before calving. A similar mixture was introduced one week later. The milk after calving showed a strong reaction for antibody against all of the injected species.

EXAMPLE 4

Production of protective principle in goats was carried on by giving daily infusions of 1 ml. of a suspension of *Salmonella pullorum* via the teat canals to a pregnant goat. The daily infusions were given over a period of more than four monhs prior to parturition. Results comparable to Example 1 were obtained.

EXAMPLE 5

A Jersey cow just starting to "udder down" was given an initial dose of M–VI *Salmonella typhimurium* containing 5 million dead organisms per ml. by hypodermically injecting 5 ml. thereof into each quarter. The injections were made with a stainless steel 18 gauge hypodermic needle three and one-half inches long, the needle being inserted into the udder close to the base of each teat at such an angle that the antigen, which was released when the mouth of the needle was in the cistern, was dispensed in the area directly above the teat.

The same dose was injected into the udder in the same way, both one week and two weeks after the initial injection; and the day after the third injection, the cow freshened, that is, had her calf. Six days after she freshened, the same doses of *Salmonella typhimurium* was again hypodermically injected into each quarter of the udder. The milk taken from the cow at that time was checked and found to have a high concentration of antibody and good titer. Her milk production was average for a cow of her size and type.

Where the introduction of the antigen into the udder is by hypodermic injection, as in Example 5, the specific point at which the needle is inserted is not too important as long as the antigen reaches the cister of the udder in the form in which it is injected.

The antibody or protective principle produced in accordance with our invention may be preserved, if desired, in pasteurized milk, condensed milk, dried milk and in gamma globulin isolated from the milk. Pasteurization has no adverse effect upon the protective principle.

The milk containing protective principle may be freeze-dried or may be condensed under careful temperature control. Dried milk containing the antibody or protective principle is preferably prepared from the non-condensed product. However, the condensed milk may be used if at first condensed carefully at low temperatures to avoid destroying of the protective principle.

Drying can be also accomplished by the conventional spray or roller drying processes under properly controlled conditions in order to preserve the protective principle. High temperatures per se are not detrimental to the protective principle except when sustained for a period of minutes. Thus the milk may be dried in a dryer in which temperatures of 300–400 degrees F. are achieved, if the milk is at these temperatures only for an instant.

A proliferating virus can be administered to the udder in a two-stage operation. The first inoculation can be made in a lactating cow. The second infusion is then made into a second cow in the pre-parturation period, the infusion being milk resulting from the first, with the accompanying tissue antigens diluted out. This screening procedure is illustrated by the following:

EXAMPLE 6

A cow was infused through the teat canals with Herpes simplex virus in mouse brain suspension. The cow was lactating and was regularly milked thereafter. The next day the milk showed a positive Whiteside test. On the second day following the inoculation, the milk was used for introduction into the udder of a dry cow, also through the teat canals. The result was the transfer of the virus without the mouse brain antigens. The expected antibody response to the virus occurred.

The antibody or protective principle which is the product of this invention is useful in a variety of ways. It has been discovered that the protective principle or antibody is absorbed into the system after the milk from stimulated udders has been ingested or administered by proctocylsis. The isolated and separated protective principle may be administered orally, rectally, parenterally and topically. The protective principle is useful in the immunization and treatment of animals.

The application of the protective principle of this invention is illustrated by the following examples:

EXAMPLE 7

The protective principle against *Salmonella pullorum* was applied to fowl. The experimental subjects were six adult chickens, all negative to the Salmonella antibody test. After one feeding of the milk containing the protective principle, all of the chickens developed a strong positive reaction.

EXAMPLE 8

A further application of the protective principle of this invention was made to chickens and showed postive protection afforded by the protective agent. Twenty day old chicks were divided into an experimental group of ten and a control group of ten. The experimental chicks were fed milk produced according to this invention with antibodies against *Salmonella pullorum. Salmonella pullorum* is a chicken disease organism. The controls were fed milk with no such specific antibody. During the first day of the experiment, the two groups were injected intracardially with an infusion of live *Salmonella pullorum* in broth. The mortality of the controls was heavy, the fifth chick being dead in 24 hours while in the experimental group, the fifth death did not occur for 120 hours. The general state of health of the control chicks was poor as compared with the experimental group. This is a severe test of the protective principle since the organisms were injected directly into the hearts of the experimental subjects, a mode of transmission which would never be encountered normally.

Chickens as a species are far removed from the cow, yet the protective principle produced in the cow is readily conveyed by the milk into the blood stream of the chickens by absorption through the digestive tract.

EXAMPLE 9

The protective principle was applied to bovine subjects. The subjects were two five month old calves with fully functional rumens. The calves were negative to the Salmonella antibody test. After two feedings of the milk containing *Salmonella pullorum* protective principle they developed strong positive agglutination reaction in the blood.

EXAMPLE 10

Porcine animals were also tested. The experimental subjects were two mature pigs weighing about 200 pounds each, and negative to the antibody test. After one feeding of milk containing protective principle against *Salmonella pullorum*, both pigs developed a weak reaction. After two feedings of the milk they showed strong reaction in the blood.

Experiments with calves and pigs show that with continued ingestion of the milk containing the antibody, the levels of the protective agent continue to increase in the blood. Experiments with calves also show that the protective principle is absorbed from the rectum. The rate of absorption from the rectum is less than from the anterior part of the system. Rectal absorption may be resorted to, however, if oral administration is contraindicated. The high antibody or protective principle containing material may be applied topically (unction) in treatment of local exacerbations due to allergy.

*Salmonella pullorum* antigen has been used in the experimental work described in the above examples because it is relatively harmless to the experimental subject; it is readily available, easily identified and its absorption into the system of the subject can be readily traced by the agglutination test. It is to be understood, however, that this specific bacterial antigen is used for illustrative purposes only and the invention is not so limited.

With the discovery that the protective principle or antibody in sufficiently high concentrations can be absorbed from the digestive tract and that it is possible to produce specific antibody to antigens by proper treatment of ungulates to stimulate such antibody or protective agent development, avenues are open for a new approach to the prevention and treatment of disease in animals. The initial step in this direction is the production of specific protective principle against a mixture of all known antigens for animals or the production of one specific protective principle such as antibody against a specific antigen.

Since the mammary gland of the cow will produce specific antibody against any of the antigens named herein, milk may be prepared with protective principle useful against infectious disease organisms and other antigens in animals. Specially prepared milk containing specific antibodies against specific, although rare diseases, and other specific antigen induced conditions may be produced. For example, protection from ragweed pollen is offered by consumption of milk with a high protective principle against ragweed pollen. This latter example, the production of a protective principle against an allergen is completely novel. The prior workers, including Holm and Porter, had no idea that such a result could be achieved.

An important application of the protective principle of this invention in the field of animal treatment is furnishing protective colostrum for calves. At the present time it has been estimated that some 20% of all calves born alive die within the first few weeks of life. Death is caused principally by infectious organisms against which antibodies may be developed. Mixed antigens of all of the common infectious diseases that kill calves are prepared and injected appropriately into the udders of cows in their preparturition period. The colostrum from such stimulated udders may be used as feed directly or may be dried, packaged and made available to feed calves immediately after birth to give the calves the necessary level of antibodies to carry them through the critical part of their life.

For administration of the protective principle of this invention to animals, a preferred method is by incorporation into milk and other dairy products. While prior methods were unable to produce a therapeutically significant concentration of antibodies in milk in its natural state, the present method yields an over abundance which permits of its dilution with milk. Since milk as produced by the method of our invention agglutinates at dilutions as great as 100,000, the original milk containing the protective agent can be greatly diluted with non-protective milk and distributed and fed in this form. Ordinarily, milk may thus be given a high protective level against specific antigenic materials. The amount of dilution is dependent upon the titer of the antibody enriched milk and the required level of antibodies needed for effectively combating the specific antigen and the like. As an example, a gallon of the original high-titer (say, 1:100,000) milk from a cow treated to produce protective principle against any particular antigen, may be admixed with nine gallons of ordinary non-protective whole milk to produce ten gallons of milk of sufficiently high titer (1:10,000) to be effective against the particular antigenic substance.

What is claimed as our invention is:

1. The method of producing antibodies in therapeutically significant concentrations in milk in its natural state, comprising the steps of:
    (A) introducing a plurality of preselected antigens in a non-pathogenic condition into the udder of a pregnant ungulate through a teat canal, and
    (B) subsequent to parturition, milking said ungulate.

2. The method of producing antibodies in therapeutically significant concentrations in milk in its natural state, comprising the steps of:
    (A) introducing a preselected antigen in a non-pathogenic condition into the udder of a pregnant ungulate through a teat canal, and
    (B) subsequent to parturition, milking said ungulate.

3. The method according to claim 2, wherein the introduction is repeated during the pre-parturition period at intervals over about two to eight weeks.

4. The method according to claim 2, wherein the introduction of said antigen into the udder of said ungulate is repeated during the lactation period of said ungulate when antibody production to said antigen has substantially declined.

5. The method according to claim 2, wherein the ungulate is a cow.

6. The method according to claim 5, wherein the antigen is a bacteria.

7. The method according to claim 5, wherein the antigen is a virus.

8. The method according to claim 5, wherein the antigen is a protein.

9. The method according to claim 5, wherein the antigen is spermatozoa.

10. The method according to claim 5, wherein the antigen is an allergen.

11. The method according to claim 5, wherein the antigen is a ragweed pollen.

12. The method of obtaining from an ungulate normal milk containing therapeutically significant concentrations of an antibody against a preselected antigen, without upsetting the normal milk producing function of the ungulate, which method comprises the steps of:
(A) introducing said preselected antigen in a non-pathogenic condition directly into the cistern of the ungulate's udder while the ungulate is pregnant; and
(B) subsequent to parturition and cessation of the period during which the ungulate produces colostrum, milking the ungulate.

13. The method of obtaining from an ungulate normal milk containing therapeutically significant concentrations of an antibody against a preselected antigen without upsetting the normal milk producing function of the ungulate, which method comprises the steps of:
(A) inserting the needle of a hypodermic syringe containing a quantity of said preselected antigen in a non-pathogenic condition, through the wall of a portion of the the udder of the ungulate while the ungulate is pregnant, to thereby bring the discharge end of the needle into open communication with the cistern of the udder;
(B) expelling the contents of the syringe, so that said non-pathogenic antigen reaches the cistern of the udder in the form in which it is contained in the syringe; and
(C) subsequent to parturition and cessation of the period during which the ungulate produces colostrum, milking said ungulate.

14. The method of obtaining from an ungulate normal milk containing therapeutically significant concentrations of antibody against a predetermined pathogenic organism known to affect the health of animals, which method comprises:
(A) introducing an antigen originating from said organism, but in a non-pathogenic condition, directly into the udder of the ungulate while the ungulate is pregnant and in a manner which assures that said antigen reaches the cistern of the udder in the form in which it is introduced; and
(B) subsequent to parturition and cessation of the period during which the ungulate produces colostrum, milking the ungulate.

References Cited

UNITED STATES PATENTS 3,127,318  3/1964  Eversole et al. _____ 167—78

OTHER REFERENCES

Famukner, trans. 15th Intern. Congresses on Hygiene Demography, vol. 2, pp. 342–345, September 1912.

Holm, U.S. patent application Serial No. 628,987, filed Nov. 15, 1945, Paper No. 1, pp. 1–7, published in O.G. December 5, 1950.

Holmann et al., J. Comp. Path., vol 62, pp. 196–213, 1952.

Hutyra, Special Pathology and Therapeutics of the Diseases of Domestic Animals, vol. I, published by Alexander Eger, Chicago, 1938, pp. 404, 654, and 655.

McCarthy et al., abst. Commun. 1st Intern. Cong. Brochem., pp. 25–26, 1949.

Miller et al., American Journal of Veterinary Research, vol. 4, pp. 318–324, 1943.

Porter, The Role of Plasma Cells in the Production of Globulins within the Mammary Gland and Time Studies on Antibody Response From Experimentally Induced Inflammation of the Udder, Ph.D. thesis, University of Minnesota, August 1951.

Wilson, The Veterinary Record, vol. 64, No. 36, pp. 525–530, Sept. 6, 1952.

Campbell et al., Science, vol. 125, No. 3254, pp. 932 and 933, May 10, 1957.

Frobisher, Fundamentals of Microbiology, 7th edition, published by W. B. Saunders Co., Philadelphia, 1962, pp. 221 and 222.

RICHARD L. HUFF, *Primary Examiner.*

LEWIS GOTTS, ELBERT L. ROBERTS, *Examiners.*